2,911,410

N (P-AMINOPHENYL) PHTHALIMIDES AS PHOTOGRAPHIC DEVELOPERS

David W. C. Ramsay, Manchester, England, assignor to Imperial Chemical Industries Limited, London, England, a corporation of Great Britain No Drawing. Application September 26, 1955
Serial No. 536,739

Claims priority, application Great Britain October 1, 1954

7 Claims. (Cl. 260—326)

This invention relates to photographic developers and more particularly to new photographic developers which are especially valuable for colour development in the presence of colour couplers.

According to our invention we provide new compounds of the formula:

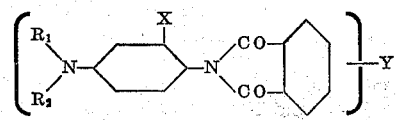

wherein $R_1$ and $R_2$ are substituted or unsubstituted alkyl radicals or $R_1$ and $R_2$ may be joined together to form with the nitrogen atom a heterocyclic ring, X is hydrogen, an alkyl, substituted alkyl, alkyloxy, substituted alkyloxy, amino or substituted amino radical and Y is an anionic solubilising group and wherein the benzene nuclei may carry substituents.

The anionic solubilising group may be for example a carboxylic or sulphonic acid group or a salt of one of these, for example an alkali metal or ammonium salt.

According to a further feature of our invention we provide a process for the manufacture of the new developers which comprises heating an amine of the formula:

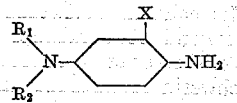

wherein $R_1$, $R_2$ and X have the meaning given above and the phenyl nucleus may carry further substituents, with phthalic anhydride or a substituted phthalic anhydride, and, where both the amine and phthalic anhydride are free from water solubilising groups, further treating the product to introduce a water solubilising group.

As examples of the new developers of our invention there may be mentioned the compound made by condensing 4-diethylaminoaniline with trimellitic anhydride (for example by heating the reagents together in boiling glacial acetic acid for 3 hours), the corresponding amino compound (X=NH₂) formed by nitration and reduction the compound made by condensing 4-amino-3-ethoxy-N:N-diethylaniline with trimellitic anhydride and the compound made by condensing 4-diethylaminoaniline with 4-sulphophthalic anhydride.

The new developers of our invention may be used in alkaline solution for the colour development of exposed gelatino silver halide emulsion layers, a colour coupler being present in the developer solution or in the emulsion layer.

According to a further feature of our invention therefore we provide a colour developing process which comprises treating an exposed gelatino silver halide emulsion layer in the presence of a colour coupler with an alkaline solution to which has been added one of the new compounds as hereinbefore defined.

It is a preferred modification of the process of our invention to treat the exposed layer in the presence of a colour coupler with an alkaline solution containing hydroxylamine, to which has been added one of the new compounds as hereinbefore defined. The developer solution may also contain other adjuvants conventionally included in developer solutions.

The new compounds in which X represents an amino or substituted amino group are especially valuable for use with conventional magenta colour couplers of the pyrazolone class in that they give magenta dyestuffs of good absorption characteristics.

The new compounds of our invention have good solubility and stability in alkaline solutions and they are superior to the 4-N:N-disubstituted-aminoanilines conventionally used for colour development in that they are free from the defect of producing serious dermatitis in workers handling them.

The invention is illustrated but not limited by the following examples in which the parts are by weight.

Example 1

100 parts of 4-diethylamino-aniline are added to 117 parts of trimellitic anhydride dissolved in 2,000 parts of glacial acetic acid and the resulting solution is boiled under a reflux condenser for 3 hours. The glacial acetic acid is then distilled off under reduced pressure and the orange-coloured residue is crystallised from n-propanol. 4-(4'-carboxyphthalimido) - N:N - diethylaniline which melts with decomposition at 255° C. is thus obtained. On analysis the product is found to contain 67.8% of carbon, 5.4% of hydrogen and 8.1% of nitrogen. $C_{19}H_{18}O_4N_2$ requires 67.5% of carbon, 5.3% of hydrogen and 8.3% of nitrogen.

Example 2

100 parts of 4-amino-3-ethoxy-N:N-diethylaniline are added to 93 parts of trimellitic anhydride dissolved in 2,000 parts of glacial acetic acid and the resulting solution is boiled under a reflux condenser for 3 hours. The glacial acetic acid is distilled off under reduced pressure and the residue is crystallised from methanol. 4-(4'-carboxyphthalimido)-3-ethoxy-N:N-diethylaniline is obtained as bright red needle-shaped crystals which melt with decomposition at 217° C. On analysis the product is found to contain 65.8% of carbon, 5.8% of hydrogen and 7.2% of nitrogen. $C_{21}H_{22}O_5N_2$ requires 66.0% of carbon, 5.8% of hydrogen and 7.3% of nitrogen.

Example 3

140 parts of 4-amino-3-ethoxy-N:N-diethylaniline are added to a solution of 128 parts of 4-sulphophthalic anhydride (obtained by heating 4-sulphophthalic acid at 180° C. under a pressure of 12 mm. for 5 hours) in 1,500 parts of glacial acetic acid. The resulting solution is boiled under a reflux condenser for 3 hours and the glacial acetic acid is then distilled off under reduced pressure. The residue is crystallized from water. 4-(4' - sulphophthalimido)-3-ethoxy-N:N-diethylamine is obtained in the form of needle shaped crystals which melt with decomposition at 280° C. On analysis the product is found to contain 54.6% of carbon and 5.7% of hydrogen. $C_{20}H_{22}O_6N_2S.H_2O$ requires 55.0% of carbon and 5.5% of hydrogen.

Example 4

100 parts of 4-amino-3-methyl-N:N-diethylaniline are added to 108 parts of trimellitic anhydride dissolved in 1,000 parts of glacial acetic acid and the resulting solution is boiled under a reflux condenser for 3 hours. The glacial acetic acid is then distilled off under reduced pressure and the residue is crystallised from methanol. 4-(4'-carboxy-phthalimido)-3-methyl-N:N-diethylaniline is obtained as pale yellow prism-shaped crystals which melt with decomposition at 230° C. On analysis the product is found to contain 67.8% of carbon, 5.6% of hydrogen and 8.1% of nitrogen. $C_{20}H_{20}O_4N_2$ requires 68.2% of carbon, 5.7% of hydrogen and 8.0% of nitrogen.

*Example 5*

100 parts of 4-(4'-carboxyphthalimido)-N:N-diethylaniline are dissolved in 1460 parts of concentrated sulphuric acid and a mixture of 21 parts of fuming nitric acid and 20 parts of concentrated sulphuric acid are added dropwise over 10 minutes, the temperature of the reaction mixture being mainatined at 0–5° C. The mixture is stirred at 0–5° C. for two hours and then poured into 20,000 parts of water containing 2,550 parts of sodium bicarbonate. The pH of the mixture is adjusted to 5 by the addition of glacial acetic acid and the crude 4-(4'-carboxyphthalimido) - 3 - nitro-N:N-diethylaniline is isolated by filtration and purified by dissolving it in benzene and precipitating it by the addition of a petroleum fraction distilling between 60° C. and 80° C.

100 parts of 4-(4'-carboxyphthalimido)-3-nitro-N:N-diethylaniline and 20 parts of Raney nickel are added to 2,000 parts of absolute ethanol and the mixture is warmed and shaken for 3 hours in an atmosphere of hydrogen at a pressure of 440 pounds per square inch. The mixture is filtered and the filtrate is evaporated to dryness and the residue is crystallised from a mixture of chloroform and petroleum fraction distilling between 60° C. and 80° C. 4-(4'-carboxyphthalimido) - 3 - amino-N:N-diethylaniline is obtained as fawn coloured crystals which melt with decomposition above 180° C.

On analysis the product is found to contain 64.3% of carbon, 5.4% of hydrogen and 12.2% of nitrogen. $C_{19}H_{19}O_4N_3$ requires 64.6% of carbon, 5.4% of hydrogen and 11.9% of nitrogen.

*Example 6*

An exposed multilayer colour photographic material carrying three differently sensitised emulsion layers containing cyan, magenta and yellow colour formers respectively is developed in a developer made up according to the following recipe:

| | Parts |
|---|---|
| 4-(4'-carboxyphthalimido-3-ethoxy - N:N - diethyl-aniline | 3 |
| Hydroxylamine hydrochloride | 1 |
| Potassium bromide | 0.5 |
| Anhydrous sodium sulphite | 2 |
| Caustic soda | 15 |
| Ethylene diamine tetra acetic acid | 1 |
| Water | 1000 |

The material is rinsed, bleached, fixed, rinsed and dried. The processed material contains cyan, magenta and yellow images in the separate layers.

What I claim is:
1. A compound of the formula:

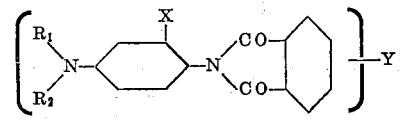

wherein $R_1$ and $R_2$ are ethyl radicals, X is selected from the group consisting of hydrogen, methyl, ethoxy, amino and nitro radicals and Y is selected from the group consisting of the carboxylic and sulphonic acid groups, and the alkali metal and ammonium salts of such groups.

2. A compound according to claim 1, said compound being 4-(4'-carboxyphthalimido)-N:N-diethylaniline.

3. A compound according to claim 1, said compound being 4-(4'-carboxyphthalimido)-3-ethoxy-N:N-diethylaniline.

4. A compound according to claim 1, said compound being 4 - (4'-sulphophthalimido)-3-ethoxy-N:N-diethylaniline.

5. A compound according to claim 1, said compound being 4-(4'-carboxy-phthalimido) - 3 - methyl-N:N-diethylaniline.

6. A compound according to claim 1, said compound being 4 - (4'-carboxyphthalimido) - 3 - amino-N:N-diethylaniline.

7. A compound according to claim 1, said compound being 4 - (4'-carboxyphthalimido) - 3 - nitro-N:N-diethylaniline.

References Cited in the file of this patent

UNITED STATES PATENTS

| | | |
|---|---|---|
| 1,450,678 | Gibbs | Apr. 3, 1923 |
| 2,442,930 | Morreall | June 8, 1948 |
| 2,547,542 | Rowland | Apr. 3, 1951 |
| 2,552,241 | Weissberger et al. | May 8, 1951 |
| 2,626,215 | Schwerin | Jan. 20, 1953 |
| 2,676,179 | Prill | Apr. 20, 1954 |